April 17, 1962
J. L. McCLINTON
3,030,234
FILLED POLYESTER RESIN HAVING A COATING
OF EPOXY RESIN AND METHOD OF
MANUFACTURING THE SAME
Filed April 2, 1958
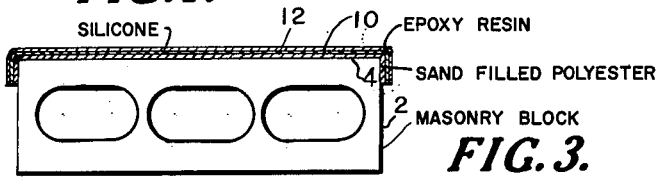
FIG. 1.
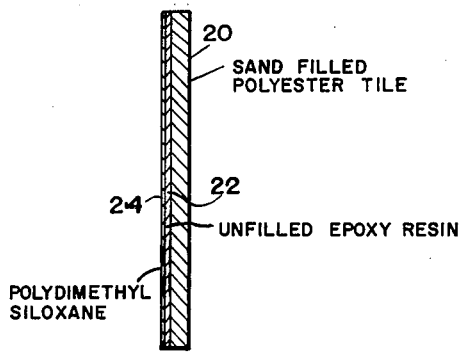
FIG. 2.
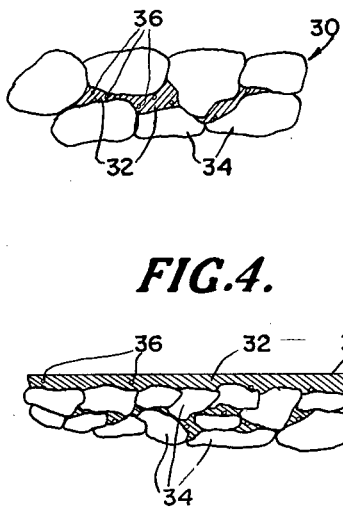
FIG. 3.
FIG. 4.
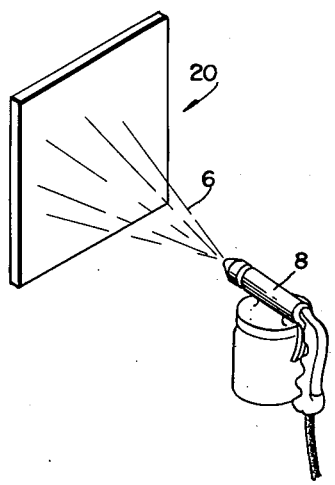
FIG. 5.
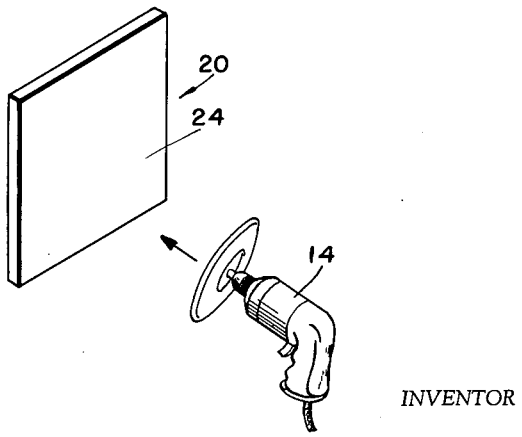
FIG. 6.
INVENTOR
JOHN L. McCLINTON
BY Cushman, Darby & Cushman
ATTORNEYS 3,030,234
FILLED POLYESTER RESIN HAVING A COATING OF EPOXY RESIN AND METHOD OF MANUFACTURING THE SAME
John L. McClinton, Glen Burnie, Md., assignor to The Burns & Russell Company of Baltimore City, Baltimore, Md., a corporation of Maryland
Filed Apr. 2, 1958, Ser. No. 725,983
11 Claims. (Cl. 117—138.8)

This invention relates to the preparation of improved filled polyester resin products.

Filled polyester resins, preferably sand filled polyester resins, have been finding increasing use as a molded facing layer for masonry blocks. They also have been successfully employed as floor and wall tiles, in monolithic moldings, e.g. in the form of letters, etc.

It has been found, however, that while the surfaces of such filled polyesters appear smooth to the naked eye, when examined under the microscope there are surface irregularities including mountains and valleys which apparently are caused by slight shrinkage of the resin around the filler particles. Additionally under the microscope many minute air pockets can be seen. Furthermore some granules of sand are forced to the surface causing a rupture in the surface. This rupture may spot and stain badly due to the air pockets resulting from the rupture.

Accordingly it is an object of the present invention to smooth out the mounts and valleys in the filled polyester resin surfaces.

Another object is to substantially reduce the air pockets in filled polyester resin surfaces.

A further object is to cover the sand pockets in sand filled polyester resin surface and hence prevent attack by dirt and the like.

An additional object is to improve i.e., increase, the gloss of filled polyester resin surfaces.

Yet another object is to improve the chemical and stain resistance of filled polyester resin surfaces.

A still further object is to improve the acid and alkali resistance of filled polyester resin surfaces.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by applying a thin coating of unfilled epoxy resin to the filled polyester resin surface. Preferably a microscopically thin silicone coating is applied over the epoxy resin surface to further improve gloss and to accelerate the tack free stage.

It is critical that the epoxy resin be applied as a very thin coating, e.g. 0.002 inch or less and preferably 0.001 inch or less since if the epoxy resin coating is too thick it will peel off and proper adhesion to the filled polyester resin will not be obtained. Furthermore undesirable smearing results if the epoxy resin coat on the filled resin is too thick. Generally the epoxy resin coat does not contain a filler since the presence of a filler would result in the coat peeling off. In fact even the presence of pigment in the epoxy resin coat has been found to be undesirable.

Hence the preferred product is a filled polyester resin having a thin coating of an unfilled epoxy resin. For best results a very thin coat of a silicone resin, e.g. a polydimethylsiloxane, is wiped over the unfilled thermosetting resin, e.g. the epoxy resin.

In the drawings:

FIGURE 1 is a vertical sectional view of a masonry building unit coated in accordance with the invention.

FIGURE 2 is a vertical sectional view of a floor tile coated in accordance with the invention.

FIGURE 3 is an enlarged fragmentary sectional view of a sand filled polyester floor tile.

FIGURE 4 is a view similar to FIGURE 3 but including a coating in accordance with the invention.

FIGURE 5 is a perspective view showing the application of the thin thermosetting resin film to a filled polyester coated block produced in accordance with the invention.

FIGURE 6 is a view showing the application of silicone resin to the block of FIGURE 5.

Referring more specifically to the drawings there is provided a slag masonry block 2 having a coating 4 of a sand filled polyester resin as described in Sergovic Patent 2,751,775. The coated block after removal from the curing mold (not shown) and while still hot, e.g. about 120° C., is then sprayed (FIGURE 5) with a liquid epoxy resin composition 6 with the aid of spray gun 8 to form a thin coating 10, about 0.001 inch thick (FIGURE 1). A microscopically thin coat of silicone resin 12, e.g. DC–200, is then applied with the aid of buffer 14, preferably without permitting the block to cool.

As shown in FIGURE 2 a sand filled polyester resin floor tile 20 is provided with a thin coating of unfilled epoxy resin 22 and further coated with polydimethylsiloxane 24.

Referring to FIGURE 3 there is shown a floor tile 30 comprising polyester resin 32 and particles of sand filler 34. There are also air pockets 36. As will be observed from FIGURE 4 by applying a coating of unfilled epoxy resins 37 these air pockets are greatly reduced and the mountains and valleys are leveled out.

For convenience in application the unfilled epoxy resin is usually applied in liquid form, e.g. diluted with a solvent such as xylene, toluene or other aromatic hydrocarbon or with diacetone alcohol, methyl isobutyl ketone, methyl amyl alcohol, butyl carbitol or the like. The unfilled resin can be sprayed on with a spray gun or wiped on with a rag or applied by a brush or other suitable means. Preferably it is sprayed on while the coated masonry unit or the floor tile or the like is hot ,e.g. 95–130° C. The filled polyester coated masonry unit or floor tile is usually cured in an oven, e.g. at 185° C. Upon removal from the oven and stripping from the mold the masonry unit or floor tile drops rapidly in temperature to about 120° C. and then cools much more slowly. The latent heat remaining in the block or tile has been found to be extremely valuable in curing the unfilled resin film, getting better gloss and in removal of the solvent utilized to apply the unfilled resin. While hot application is preferred the unfilled resin can be applied at room temperature (20° C.) or even below.

The amount of filler, e.g. sand, can be 50 to 90% of the total of resin, monomer and filler by weight in the filled polyester resin in the present invention as well as in the Sergovic patent. However, it has been found that by use of the present invention the ratio of filler, e.g. sand, to resin and monomer can be as much as 4.5 to 1 or even up to 5 to 1 without staining whereas in the Sergovic procedure if the ratio of sand to monomer is much above 3.6 to 1 objectionable staining occurs. Since the filler is much less expensive than the resin this ability to increase the proportion of the cheaper material is an important advantage of the present invention. Additionally the increased number of air voids which occur due to the increased amount of sand are not a serious problem in the present invention since the subsequent coating with unfilled resin eliminates many of these voids.

Not only does the present invention result in the filling of the voids in the filled polyester resin and the formation of a smooth continuous surface but the surface also has a uniform and high gloss in contrast to the normal flat surface of conventional filled, e.g. sand filled polyester coated masonry blocks or floor tiles. This high gloss is further improved by the application of the silicone resin. As previously set forth the silicone is preferably applied hot, e.g. while the unit is at a temperature of 95–130° C., but it can be applied at room temperature.

The buffing operation, either by hand or mechanical muffing, aids in insuring that the unfilled epoxy resin settles in the cavities while at the same time the excess of unfilled resin is removed while it is still in a semi-liquid or liquid state. The silicone is usually applied as a monomolecular film by incorporation in the buffing rag or the mechanical buffer. Suitable silicones include the polydimethylsiloxanes such as DC–200 and antifoam A as well as other polydialkyl siloxanes and polyalkylaryl siloxanes.

As previously indicated the filled resin can be a polyester resin. The preferred polyester resins are polymeric ester reaction products of one or more dicarboxylic acids and one or more polyhydric alcohols. Desirably, one or more of these reactants shall contain a reactive double bond or ethylenic linkage. Among the dicarboxylic acids which may be used are phthalic, malic, maleic, fumaric, adipic, pimelic, suberic, sebacic, itaconic, citraconic, and succinic acids and their anhydrides. It is essential that some of the dicarboxylic acid component of the polyester resin contain an unsaturated ethylenic linkage. For this reason, maleic and fumaric acids are most desirable. Among the polyhydric alcohols which may be used are ethylene glycol, diethylene glycol and propylene glycol. A mixture of propylene glycol and dipropylene glycol is the most satisfactory polyhydric alcohol. One may use an unsaturated monohydric alcohol in place of part of the polyhydric alchol. A typical example of such an alcohol is allyl alcohol which produces an allyl ester of the dicarboxylic acid. The polyester resins may be suitably modified or plasticized by the incorporation of alcohols, fatty acids, etc., to modify the chemical and physical characteristics as desired. The polyesters should comprise upward from about 15% or 30% and preferably 50% to 85% by weight of the resin and resin forming component, e.g., styrene, of the coating composition.

The resin component of the filled composition should also contain a non-volatile, monomeric, cross-linking solvent for the polyester resin. The function of this solvent is to make the polyester resin more fluid and also to cross-link the polyester resin at the time of curing to produce a cross-linked, or three dimensional resin with the polyester resin which is thermosetting in character. This monomeric solvent is an important member of the resin component, for it provides the necessary fluidity to the resin component, imparts thermosetting characteristics to the cured resin and is consumed during the curing of the resin without forming volatile materials.

Among the monomeric polymerizable solvents which may be used are the hydrocarbons: styrene, vinyl toluene, e.g., o-vinyl toluene, p-vinyl toluene, and m-vinyl toluene, cyclopentadiene; vinyl acetate; diallyl esters, e.g., diallyl phthalate and triallyl cyanurate, as well as alpha methyl styrene. Styrene has produced the most satisfactory results thus far. Of course various other monomers may be used including methyl methacrylate as a portion of the solvent. It will be observed that all of these monomeric polymerizable solvents which can be used for cross-linking are ethylenically unsaturated materials.

To hasten the curing of the polyester resin, there is incorporated an oxidizing catalyst, e.g., dicumyl peroxide, cumene hydroperoxide, benzoyl peroxide, methyl ethyl ketone peroxide, t-butyl peroxide, etc. Preferably, the catalyst is used in an amount of 4% of the resin weight, although smaller amounts of catalyst, e.g., 0.5 to 2%, can be employed.

The epoxy ethers or resins suitable for use in the compositions of the present invention contain along with ethereal oxygen, glycidyl groups in such quantity that the material has a 1,2-epoxy equivalency in the average molecule of greater than one.

The epoxy resins employed in the present invention are devoid of ethylenic unsaturation or similar polymerizable grouping. In general, the only functional groupings present are hydroxy, ether and epoxy groups. Thus, the epoxy resins are prepared from saturated polyhydric alcohols and phenols which contain no carbon to carbon unsaturation other than that which is present in the aromatic ring.

By the epoxy equivalency, reference is made to the average number of 1,2-epoxy groups

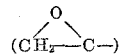

contained in the average molecule of the ether.

A preferred group of epoxy ethers for use in the invention is prepared by reacting a dihydric phenol with epichlorhydrin in alkaline solution. These products are of resinous character and frequently are solid materials at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis phenol-A), 4,4'-dihydroxy benzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(hydroxy-2-tertiary butyl phenyl)-2,2-propane, bis-(2-dihydroxynaphthyl)-methane, 1,5-dihydroxy naphthalene, etc. The product may be represented by the formula:

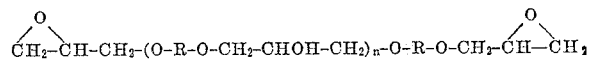

wherein $n$ is an integer, preferably from 1 to 7, and R represents the divalent hydrocarbon radical of the dihydric phenol. The preferred epoxy ethers for use in the invention are those having epoxy values no less than 0.20 (pyridinium chloride method), and melting points no greater than 80° C. (Durran's mercury method). The pyridinium chloride and Durran's mercury method are disclosed in Patent No. 2,500,449. The preferred phenol is bis phenol-A.

Less preferably, there can be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erythritol, pentaglycerol, mannitol, sorbitol, and the like.

In general, the glycidyl ether resin will have an epoxy equivalency greater than 1 and usually not more than about 2. The epoxy equivalency may be defined as the number of epoxy groups per molecule in contrast to the epoxy value which is the number of epoxy groups in 100 grams of the resin.

Typical epoxy resisns which can be employed are the Epon resins which are made from bis phenol-A and epichlorhydrin. The following table describes the properties of several of such resins.

| Epoxy Resin | Av. Mol. Wt. | M.P., ° C. | Sp. gr. |
| --- | --- | --- | --- |
| Epon 562 * | 300 | liquid | 1.2304 |
| Epon 828 | 390 | 8–12 | 1.1676 |
| Epon 834 | 530 | 20–28 | 1.1648 |
| Epon 864 | 630 | 40–45 | 1.1881 |
| Epon 1001 | 1,000 | 64–76 | 1.2041 |
| Epon 1004 | 1,850 | 95–105 | 1.154 |

* Glycerol-epichlorhydrin.

There can also be used epoxy resins such as Araldite 6010, viscosity 10,000–20,000 cps. at 22° C., and Araldite 6020, viscosity 20,000–40,000 cps. at 22° C. and Araldite 6071, softening point 70° C., epoxy value 2.05, Epoxide equivalent 485; these Araldite resins are also made from bis phenol-A and epichlorhydrin.

Those epoxy resins which are liquid at room temperature can be poured into the mold while those which are solids should be heated above their melting points. The mold is desirably also maintained above the melting point of the resin prior to the curing step. The epoxy resins can be used alone or in admixture with each other or with other resins.

In using the epoxy resin compositions of the invention, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, m-phenylenediamine, 3-diethylaminopropylamine, pyridine, piperidine, dicyandiamide, melamine and the like. The hardening agent is added and mixed in with the composition in order to effect hardening. The amounts vary considerably depending upon the particular agent employed. For the alkalies or phenoxides, 2 to 4 percent is suitable. With phosphoric acid and esters thereof, good results are obtained with 1 to 10 percent added. The amino compounds are used in amounts of about 5 to 15 percent and the others involve addition of about 1 to 20 percent.

The amounts of catalyst are based on the epoxy resin by weight. While curing can be accomplished at room temperature, it is normally preferable to heat the composition, e.g., to 150° C., in order to hasten the curing. Generally, temperatures of 100° C. to 180° C. have been found expedient for curing.

The filled resin composition generally contains 40 to 90%, preferably 50 to 90% by weight of a filler. The filler normally is granular and may be sand, calcium carbonate, clay, glass beads, diatomaceous earth, asbestine, granular marble, finely divided silica, finely divided acid-resistant crushed rock, e.g. gravel, alumina, titanium dioxide, talc, Wollastonite (calcium silicate), etc. The preferred filler is sand. Further details as to the preferred ways of preparing the filler are described in the Sergovic patent.

The filled polyester resin composition can be employed to form a wall or floor tile or a monolithic casting or can be used to apply a coating to a masonry building unit, e.g. a block made from slag, cinders, cement, haydite, clay, concrete or the like. The preferred manner of formation of coatings of filled polyester resins on masonry units is disclosed in the Sergovic patent.

The filled compositions likewise can contain thixotropic agents, e.g. Cabosil or Santocel (prepared silica) or the like. Similarly there can be added modified clays such as the Bentones e.g. Bentone 34 (dimethyldioctadecylammonium bentonite). Likewise there can be added driers such as manganese and cobalt naphthenates.

The thin unfilled resin coating shown in the drawings at 10, 22 and 36 can be any of the same epoxy resins as described in connection with the filled compositions. However, in order to apply the unfilled epoxy resin as a thin film, e.g. 0.001 inch or less, it is diluted with a volatile solvent so that it can be conveniently applied either by spraying with a spray gun, by wiping on with a cloth or by a brush in the manner previously described. The particular solvent employed is not critical.

Unless otherwise stated all parts and percentages are by weight.

EXAMPLE 1

A slag block was coated with the polyester resin and sand composition exactly as described in Example 1 of the Sergovic patent. Curing was accomplished in a gas fired oven at 180° C. for 30 minutes. The coated block was removed from the mold and while still hot, about 120° C., was sprayed with an unfilled epoxy resin composition prepared as follows:

Portion 1

463 parts of Araldite 571 KX (a 75% solution of Araldite 607 epoxy resin in a mixture of 2 parts xylene and 1 part diacetone alcohol), 38 parts xylene, 37 parts Cellosolve, 37 parts diacetone alcohol and 25 parts of Beetle 216–8 (butylated urea-formaldehyde resin) were stirred and allowed to stand for 24 hours. (The Beetle 216–8 aids in the spreading of the composition. In place of Beetle 216–8 there can be used Beetle 228–8 or Ethocel 7 cp.)

Portion 2

95 parts of Araldite 571 KX, 58 parts of xylene and 58 parts of methyl amyl alcohol were stirred and 29 parts of triethylene tetramine added slowly with agitation to control the exotherm. The composition was allowed to stand for 24 hours.

After thus standing for 24 hours portions 1 and 2 were combined and allowed to stand for 1 hour prior to use. The combination has a useful pot life of 5 to 15 hours.

The unfilled epoxy resin composition was sprayed on to the filled polyester resin coated block to form a film having a thickness slightly less than 0.001 inch. Because of the latent heat in the masonry unit the epoxy resin coating dried tack free almost instantaneously, and the curing was initiated and accelerated by the latent heat. While the coated masonry unit was still hot it was buffed with a buffer impregnated with Dow-Corning DC–200 silicone, this allowed the unit to be cubed faster, i.e. without the buffing with Dow-Corning 200 fluid it would remain tacky longer. The resulting finish had a high gloss and when the coated masonry unit was examined under the microscope it was observed to have a much smoother finish than a similar sand-polyester resin coated unit having no epoxy resin or silicone coating. The gloss also was much more than that obtained by merely buffing with DC–200 a similar sand filled-polyester resin coated masonry unit, which did not have the unfilled epoxy resin coat. Additionally it was observed that merely utilizing a DC–200 buffing did not furnish the smooth surface devoid of mountains and valleys obtained when the epoxy resin coat was employed.

EXAMPLE 2

Example 5 of the Sergovic patent was repeated to form a sand-filled polyester resin coated slag-masonry load bearing block. The coated block was cured in an oven at 180° C. for 30 minutes. The hot block was removed from the mold and while still hot was sprayed with an unfilled epoxy resin composition prepared exactly as in Example 1 except that the 25 parts of Beetle resin were replaced by 25 parts of Ethocel 7 cp. (ethyl cellulose). The hot block was then buffed mechanically. In this case the buffer was not impregnated with a silicone, this resulted in some smearing. The resulting product when examined under the microscope had a smooth surface with reduced air holes as compared with a similar sand-polyester resin coated block omitting the epoxy resin coating. The coated block of Example 2 exhibited a good gloss which was intermediate between that obtained with the block of Example 1 and the gloss obtained with a silicone buffed sand-polyester resin coated block omitting the epoxy resin coating.

EXAMPLE 3

Example 2 was repeated but in place of the ratio of one part of polyester resin composition to 3.2 parts of sand there was employed one part of the polyester resin composition to 4.5 parts of sand.

EXAMPLE 4

A sand filled ethylene glycol-propylene glycol-phthalic anhydride-maleic anhydride polyester resin floor tile was allowed to cool to room temperature after removal from the curing oven. There was then wiped on a thin coating of the unfilled epoxy resin composition of Example 1. This was allowed to dry for 20 minutes and the surface was next buffed with a DC-200 silicone impregnated rag to obtain a product having good gloss and a smooth exterior surface.

EXAMPLE 5

Example 4 was repeated replacing the silicone buff with a buffing action of a rag impregnated with a mixture of 50% alcohol and 50% water. This procedure is not as good as the silicone buff.

I claim:
1. An article comprising a mixture of a granular filler and a polyester resin as a substrate, said resin being prepared from an ethylenically unsaturated polyester and a polymerizable ethylenically unsaturated monomeric cross-linking solvent, said filler being from 50 to 90% of the total of said resin and filler, said substrate having a coating not over about 0.002 inch of an unfilled thermosetting epoxy resin having a 1,2-epoxy equivalency greater than one.
2. An article comprising a mixture of a granular filler and a polyester resin as a substrate, said resin being prepared from an ethylenically unsaturated polyester and a polymerizable ethylenically unsaturated monomeric cross-linking solvent, said filler being from 50 to 90% of the total of said resin and filler, said substrate having a coating not over about 0.002 inch of an unfilled thermosetting epoxy resin having a 1,2-epoxy equivalency greater than one and having a thin buff coating of a silicone over said unfilled resin.
3. An article according to claim 2 wherein the silicone is a polydialkyl siloxane.
4. A combination of a masonry building unit and a facing therefor comprising a mixture of a granular mineral filler and a polyester resin as a substrate, said resin being prepared from an ethylenically unsaturated polyester and a polymerizable ethylenically unsaturated monomeric cross-lining solvent, said filler being from 50 to 90% of the total of said resin and filler, said substrate having a coating not over about 0.002 inch of an unfilled thermosetting epoxy resin having a 1,2-epoxy equivalency greater than one.
5. A combination according to claim 4 wherein the epoxy resin is not over about 0.001 inch thick.
6. A process according to claim 5 including the additional step of buffing a thin film of a silicone over said unfilled resin.
7. A process of improving an article comprising a granular filler and a cured polyester resin prepared from an ethylenically unsaturated polyester and a polymerizable ethylenically unsaturated monomeric cross-linking solvent, said filler being from 50 to 90% of the total of said resin and filler, comprising coating the same with a film not exceeding about 0.002 inch of an unfilled thermosetting epoxy resin having a 1,2-epoxy equivalency greater than one.
8. A process of improving a molded, filled polyester resin, said resin having been prepared from an ethylenically unsaturated polyester and a polymerizable ethylenically unsaturated monomeric cross-linking solvent, the filler being from 50 to 90% of the total of resin and filler, said process comprising coating said filled resin while hot with a film of an unfilled epoxy resin having a 1,2-epoxy equivalency greater than one and having a thickness not over about 0.002 inch.
9. A process according to claim 8 wherein a thin film of a silicone is buffed on the epoxy resin prior to cooling.
10. A process of improving a molded, filled polyester resin, said resin having been prepared from an ethylenically unsaturated polyester and a polymerizable ethylenically unsaturated monomeric cross-linking solvent, the filler being from 50 to 90% of the total of resin and filler, said process comprising cooling said filled polyester resin from a hot molded condition and thereafter coating said filled resin with a film of an epoxy resin having a 1,2-epoxy equivalency greater than one and having a thickness of not over 0.002 inch.
11. A combination of a masonry building unit and a facing therefor comprising a mixture of a granular mineral filler and a polyester resin as a substrate, said resin being prepared from an ethylenically unsaturated polyester and a polymerizable ethylenically unsaturated monomeric cross-linking solvent, said filler being from 50 to 90% of the total of said resin and filler, said substrate having a coating not over about 0.002 inch of an unfilled thermosetting epoxy resin having a 1,2-epoxy equivalency greater than one, and having a thin film of a polydimethyl siloxane over said epoxy resin.

References Cited in the file of this patent

UNITED STATES PATENTS

| | | |
|---|---|---|
| 2,626,223 | Sattler et al. | Jan. 20, 1953 |
| 2,657,153 | Russell | Oct. 27, 1953 |
| 2,699,402 | Meyer | Jan. 11, 1955 |
| 2,709,664 | Evans | May 31, 1955 |
| 2,751,775 | Sergovic | June 26, 1956 |
| 2,817,619 | Bickel et al. | Dec. 24, 1957 |
| 2,861,011 | Asbeck et al. | Nov. 18, 1958 |
| 2,881,091 | Schulze | Apr. 7, 1959 |
| 2,903,381 | Schroeder | Sept. 8, 1959 |